United States Patent [19]
Van Dest

[11] 3,807,449
[45] Apr. 30, 1974

[54] HYDRAULIC VALVE CONTROL

[75] Inventor: Jean Claude Van Dest, Westland, Mich.

[73] Assignee: Massey-Ferguson Inc., Detroit, Mich.

[22] Filed: Jan. 8, 1973

[21] Appl. No.: 322,035

Related U.S. Application Data

[62] Division of Ser. No. 145,355, May 20, 1971, Pat. No. 3,734,129.

[52] U.S. Cl. ........ 137/596.14, 137/491, 137/596.13, 137/495, 251/35
[51] Int. Cl. ............................................. F16k 11/00
[58] Field of Search .......... 137/596.13, 596.14, 491, 137/495; 251/35

[56] References Cited
UNITED STATES PATENTS
3,744,518  7/1973  Stacey.............................. 137/491

Primary Examiner—Henry T. Klinksiek
Assistant Examiner—Robert J. Miller
Attorney, Agent, or Firm—George C. Bower

[57] ABSTRACT

A hydraulic directional valve system which may be used for controlling motor cylinders associated with a tractor or the like has paired sliding spool valves operated in opposite directions by a walking beam lever to control connection of an inlet and an outlet with either of a pair of motor ports. Slow rates of feed are obtained by metering the flow out of the motor port, whether induced by pump pressure or gravity. For this purpose, a pilot operated metering-out valve has its pilot controlled by the main spool to provide first a series of gradually increasing small openings and during final movement of the spool to cause instantaneous opening of a large pilot operated metering-out valve which opens in a direction opposite to the movement of the main spool. The system includes a pilot operated pressure relief valve which provides unloading of the supply pressure when all directional valves are in neutral, which provides also hydraulic detent release for the main spool during slow metering and when pressure builds up at the end of a motor stroke and which further provides overload relief at a still higher maximum pressure.

6 Claims, 4 Drawing Figures

HYDRAULIC VALVE CONTROL

This is a division of my co-pending application, Ser. No. 145,355 filed on May 20, 1971 and entitled HYDRAULIC CONTROL VALVE now U.S. Pat. No. 3,734,129.

This invention relates to pilot controlled hydraulically balanced pressure relief valves.

The sliding spool type of direction valve, which is almost universally used in mobile equipment for controlling hydraulic motor cylinders and the like, becomes somewhat unwieldy when designed for the larger systems, and is difficult to control manually for small rates of flow while at the same time providing for a large flow when the valve is in its extreme position. Previous attempts to overcome this problem are typified by U.S. Pat. No. 2,532,552 to Jirsa of Dec. 5, 1950, in which a pair of load-holding poppets move at right angles to the main spool and are opened by cam surfaces provided on the spool to gradually open one poppet or the other. This, however, requires a long stroke for the spool if full opening is to be achieved at extreme displacement and further imposes side loads on the spool which interfere with these operations.

The related invention, previously referred to (and later described herein), overcomes such problems by the provision of a hydraulic directional valve system comprising a body having a pair of spool-receiving bores, each with a lateral port for inlet and for outlet, with an axial port for flow to and from a motor and with a third lateral port connected by a one-way passage with the axial port, a pair of main spools slidable in the bores to control flow between the lateral ports, operating means to shift the spools simultaneously in opposite directions, a seat in each axial port, a poppet coaxial with each spool and biased toward the seat by a spring and by pressure in the axial port, an oppositely facing smaller seat between each spool and its poppet, and a pilot valve normally closing the smaller seat and arranged to be progressively opened by motion of the main spool for metered flow out of the axial port, and means on the pilot valve for rapidly opening the poppet after a further increment of motion of the main spools.

With directional valves of the closed center type, it is customary to provide an unloading valve controlled by the directional valves to relieve the supply pressure when all directional valves are in neutral. It is also necessary to provide overload protection through provision of a pressure relief valve and a further feature involves a detent for holding a directional valve in extended position and releasing the detent when the motor reaches the end of its stroke or stalls for other reasons. This latter provision requires a pressure sensing valve to release the detent.

The present invention aims to provide a pilot operated hydraulically balanced pressure relief valve comprising a body having an inlet and an outlet, a poppet valve normally closing flow therebetween and having nearly equal opening and closing areas exposed to inlet pressure, a restricted orifice between the inlet and the closing area, manual means for venting the closing area to the outlet to open the poppet at will independently of the inlet pressure, a pilot relief valve exposed to the closing area and having two stages of opening in the first of which at a predetermined pressure the manual means, if not venting the closing area, is caused to move to a venting position and in the second stage, the poppet acts to limit the inlet pressure to a predetermined higher value.

Figure 3:
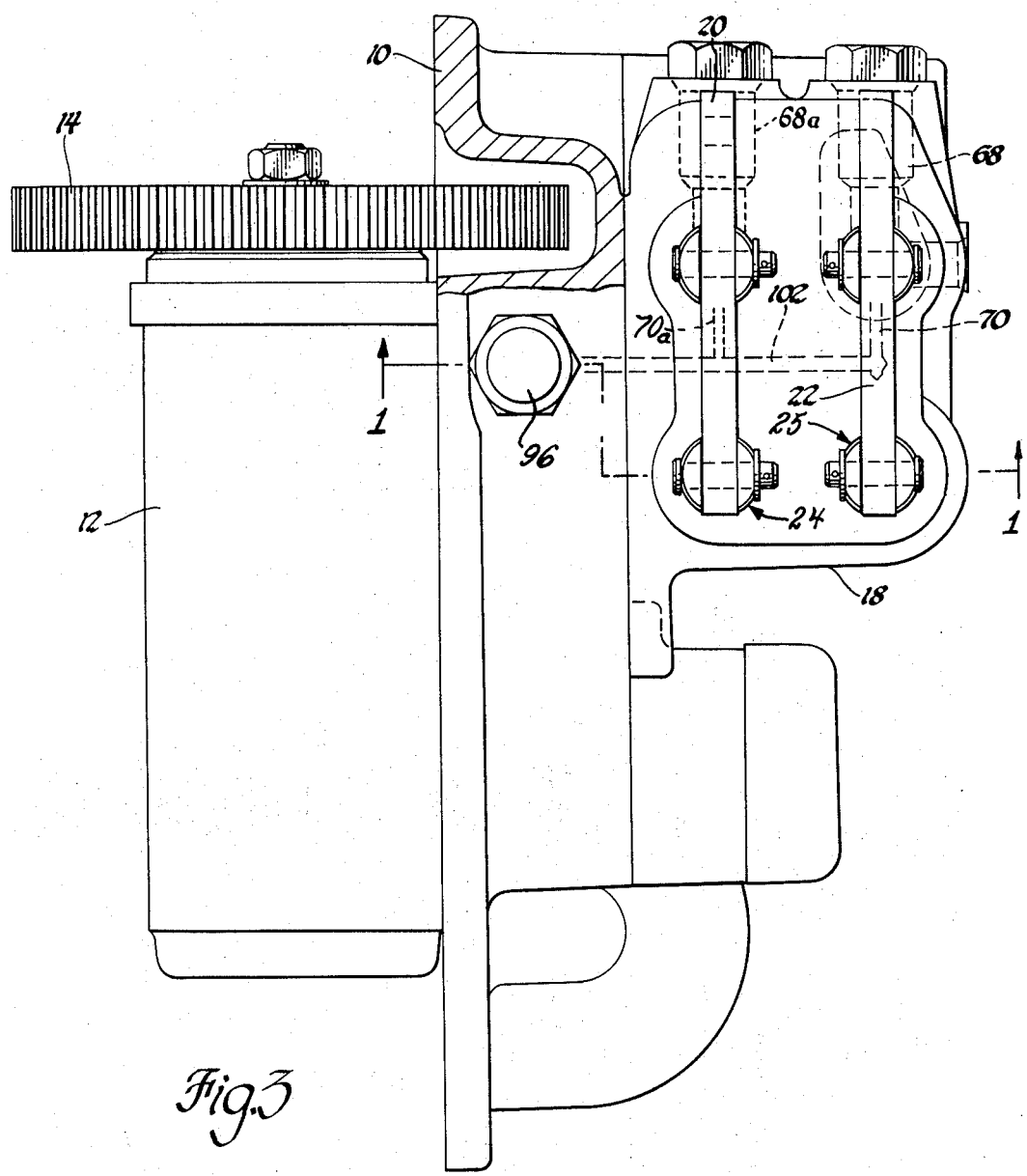
FIG. 3 is a top view of the pump and valve assembly illustrated in FIG. 1.

The pump and valve assembly illustrated in the drawings comprises a main base plate 10 which functions both as a valve body, as a support for a pump 12 (FIG. 3) and as a closing cover for a suitable opening on a gear casing of a tractor or other power device. The pump 12 has a gear 14 which, when the base 10 is secured in place, will mesh with one of the gears inside the gear housing. The pump also carries an inlet filter 16 (FIG. 1) extending downwardly into the gear casing which carries a supply of hydraulic fluid.

Figure 2:
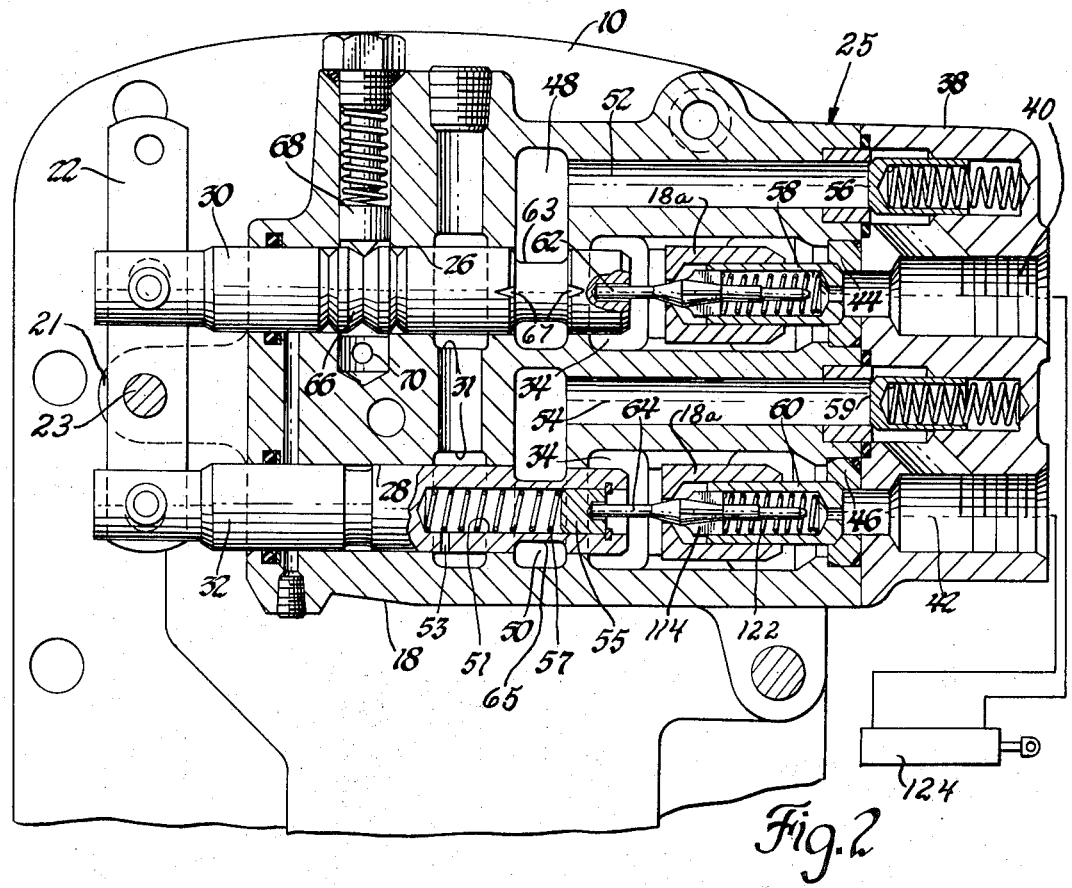
FIG. 2 is a sectional view taken on line 2—2 of FIG. 1.

Mounted on the base 10 is a directional valve body 18 in which are provided two four-way directional valves 24–25, one being controlled by the operating lever or walking beam 20 and the other by a similar lever 22, each of which is pivoted as at 23 to a lug 21 on the body 18 (FIG. 2). Each four-way directional valve, which will hereafter be referred to as valves 24 and 25, consists of a structure such as appears in FIG. 2, where the valve 25 is illustrated. The following description of valve 25 will be equally applicable to the structure of valve 24. Thus, the body 18 is provided with two bores 26 and 28 for valve 25 which receive slidable spools 30 and 32, respectively.

The spools 30 and 32 are identical in structure except spool 30 has detent grooves 66 (later described herein) and spool 32 has a neutral fluid passing groove (later described herein). Spool 32 is also illustrated with an alternate feature. This feature comprises piston 55 and spring 57 to allow the lowering of an actuated cylinder only when the pump is operating and will be described at the end of the specification.

Figure 1:
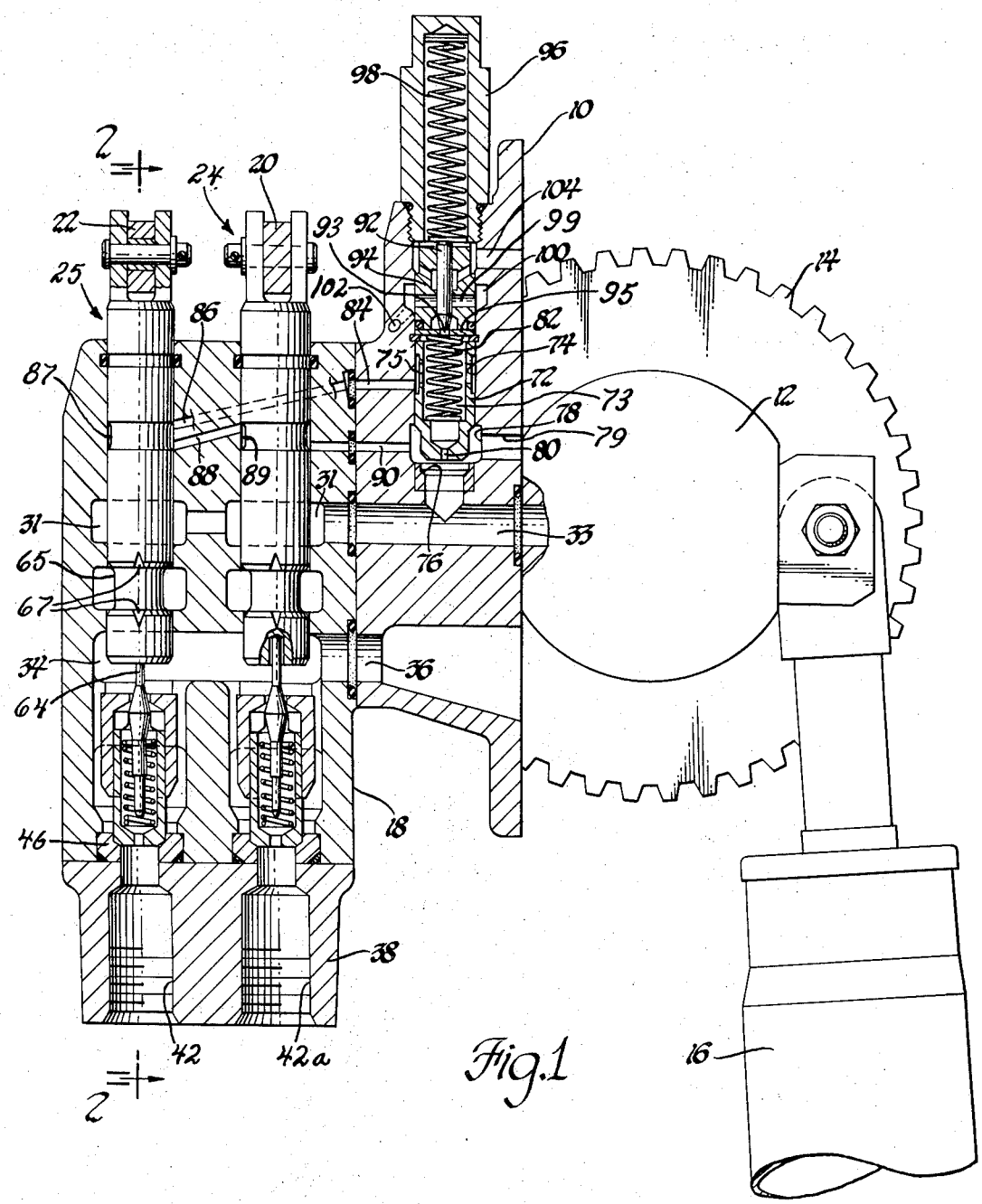
FIG. 1 is a view, partly in section taken along line 1—1 of FIG. 3, of a pump and valve assembly incorporating a preferred form of the present invention.

The operating lever 22 will move both spools in opposite directions away from the neutral position illustrated. Lateral inlet or supply ports 31 communicate with each valve bore as shown in FIG. 1, and are connected by a passage 33 in the base plate 10 with the delivery port of the pump 12. Lateral outlet ports 34 communicate with the sump via the passage 36 in FIG. 1.

Secured to the bottom of the valve body 18 (FIGS. 1 and 2) is a terminal block 38 which has a pair of motor ports for each of the directional valves. The ports are shown as ports 40 and 42, in FIG. 2, for valve 25. For valve 24 only one port 42a of two ports is shown in FIG. 1. These ports are coaxial with the main valve spools and connect with the bores 26 and 28 through valve seats 44 and 46, respectively. Lateral ports 48 and 50 communicate via passages 52 and 54, containing one-way check valves 56 and 59, with the motor ports 40 and 42. Either the lateral port 48 or the lateral port 50 is connected to the supply ports 31 by the grooves 63 or 65 when the operating lever is moved to direct flow through one of the motor ports 40 and 42. The grooves 63 and 65 may be provided with V- notches 67 to move the metering at low rates of flow.

Normally closing the seats 44 and 46 are pilot operated meter-out valves 58 and 60 which are controlled by pilot valves 62 and 64 which move with the respective main spools 30 and 32 to the right of center only.

One of the spools such as 30 is provided with grooving 66 for cooperation with a spring pressed detent 68 to retain the spool in any of its three positions. The detent may be released by admission of pressure fluid through a conduit 70.

Referring now to FIG. 1, the base 10 includes a pilot operated valve 72 for regulating the delivery of pressure fluid from the pump 12 to the valve body or block 18. The poppet valve 72 slides in a bore 74 and seats upon a seat 76 to close off communication between delivery passage 33 and chamber 78 which is open to the reservoir through exhaust passage 79. The poppet valve 72 has an orifice 80 through which inlet pressure is admitted to the inner cylindrical chamber 73 of the valve 72 to act on the upwardly facing or closing area of the poppet valve 72 and with the assistance of a spring 82, normally urges the poppet toward its seat 76. In the position of the parts illustrated in FIG. 1, however, the closing area is vented through ports 75 in the cylindrical wall of valve 72 passages 84, 86, 88 and 90 and the grooves 87, 89 of the spools. Orifice 80 creates sufficient pressure drop to such flow that the poppet valve is held open by the full inlet pressure acting on its lower or opening face thereby allowing fluid to pass by the seat 76 and into the chamber 78. When either of the spools are moved from the position shown in FIG. 1, the flow of fluid through the passages 84, 86, 88, 90 is cut off. When the flow of fluid through orifice 80 is cut off, the poppet 72 is seated by the spring 82.

A pressure responsive pilot valve 92 is slidable in a fixed ferrule 94 mounted in the bore 74 and held in place by a cap 96. A spring 98 allows the pilot relief valve 92 to move upwardly when a predetermined pressure is reached in the bore 74 and will first allow fluid to escape through the valve orifice 93 in the plate 95 and the radial passages 99 in the ferrule 94 into a chamber 100 which connects by passages such as illustrated at 102 in FIGS. 1 and 3 with the passages 70 and 70a and the detents 68 and 68a. At still higher pressure in bore 74, the pilot valve 92 will rise sufficiently to allow fluid to escape through the exhaust passage 104 and thus poppet 72 will act as a pressure limiting relief valve under these conditions.

Figure 4:
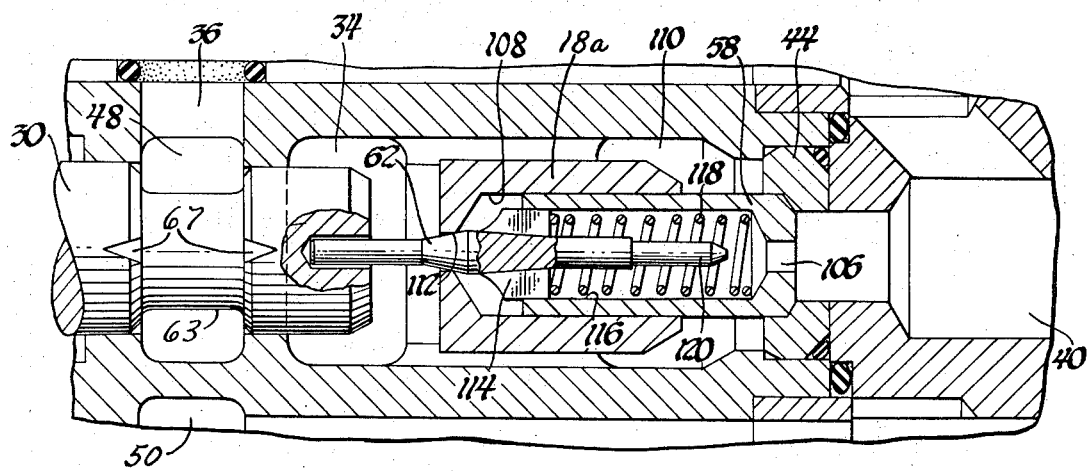
FIG. 4 is a fragmentary view on a larger scale illustrating a portion of the structure in FIG. 1.

Referring now to FIG. 4, the meter-out valve, which is associated with the spool 30 of valve 25, is illustrated there in larger scale and exemplifies the meter-out valves associated with each of the other three spools. The piston 55 and spring 57 are shown in FIG. 2 is an alternate form of the spools. The poppet 58 has a fairly large orifice 106 extending through it to allow fluid to act on its closing surface to hold poppet 58 closed. The poppet 58 slides in a bore 108 formed in its closing surface to hold poppet 58 closed. The poppet 58 slides in a bore 108 formed in the body 18. Passages 110 around the cylindrical portion 18a bypasses the opening formed by the bore 108 from the seat 44 to the outlet port 34. A smaller seat 112 is formed at the end of inner bore 108 and faces oppositely to the seat 44, being normally closed by the conical portion 112 of the pilot valve 62. The latter has wings 114 which guide it within the interior bore 116 of the poppet 58 and provide an abutment for the spring 118 which urges both the main poppet 58 and the pilot valve 62 against their respective seats.

The pilot valve 62 has a restricting pin 120 which is spaced from the orifice 106 sufficiently as to not begin restricting it until the pilot valve 62 has moved to open the seat 112 to its maximum opening. At about this position in the travel of pilot valve 62, the restricting pin approaches the orifice 106 and when the flow therethrough is sufficiently restricted compared with the available flow area at the seat 112, the poppet 58 will rapidly move to the left into the cylindrical portion 18a, further restricting the orifice 106 and providing free flow from the motor port 40 to the outlet port 34 through passages 110. Prior to this, all such flow took place through orifice 106 and the orifice formed by seat 112. The area of the latter, of course, is governed by the taper on the pilot valve 62 and the degree of its displacement as main spool 30 is moved to the right.

The valve system here disclosed allows very gradual metering out of fluid from the cylinder port along a substantial range of travel of the main spool as previously described. During such travel, pressure is maintained in the opposite cylinder port and in the inlet port because of the wider opening between ports 31 and 48 or 50. This pressure reacts upon the pilot relief valve 92 which opens to admit pressure fluid through passages 102 and 70 to the detent 68 and thus assures that precise control of the valve spools is not inhibited by the detent.

It is frequently desirable in the control of double acting cylinders which are subject always to a gravity load in one direction that means be provided for preventing the load from dropping under gravity alone faster than the rate of pressure fluid supply from the pump will fill the unloaded end of the cylinder. Customarily, a separate counterbalance valve is provided which blocks the outflow from the loaded end of the cylinder until a predetermined substantial pressure is built up in the pressure supply line. The present valve system is readily adaptable to performing this function by the provision of a small auxiliary piston within the spools.

This alternative feature is illustrated in FIG. 2 in connection with the lower spool 32. The spool has a bore 51 at its right-hand end which communicates by a passage 53 with the pressure supply port 31. Slidable in the bore 51 is a piston 55 which is urged to the right by a spring 57, which spring is weaker than the spring 122 for the pilot valve 64. Thus, when the valve spools are shifted to lower the load by exhausting fluid from port 42, the pilot valve 64 cannot be opened by piston 55 and spring 57 alone. It requires, in addition, the development of a substantial pressure level in the supply port 31 to hold piston 55 in the position illustrated and thus overcome the force of spring 122 and open pilot valve 64. In this way, the sudden dropping of a heavy load is prevented when less pressure is supplied from port 31. The load must be positively lowered by a significant positive pressure applied in the lowering direction.

I claim:

1. A valve apparatus comprising a body having a bore, an inlet, outlet means, a member slidably mounted in the bore for controlling the flow between the inlet and the outlet means, means for providing flow through the body, said member having a chamber and opening means for connecting said chamber with said flow means, first orifice means in the member and connecting to said inlet to said chamber to provide a pressure drop on occurance of flow to move said member to connect the inlet and outlet means, a second orifice means in communication with said chamber, pin means for closing and opening said second orifice means to modulate flow at small rates through the second orifice means when said flow means is closed and at a predetermined pressure opening to the outlet means to permit flow through said second orifice means to said outlet means.

2. A pilot controlled hydraulically balanced pressure relief valve comprising a body with a bore and first seat, a poppet valve slidable in the bore and closing the first seat against flow through the first seat toward the poppet valve, a first outlet in the body for discharging flow through the first seat, means forming an orifice through the poppet valve, an oppositely facing second seat in the body for carrying flow from the orifice to the second outlet, and a pilot valve having a plug controlling the second seat to modulate flow at small rates through the orifice and effective when the pilot valve has achieved a predetermined opening at the second seat to restrict the orifice and unbalance the poppet valve to effect movement of the poppet valve away from the first seat, and means forming a passage from the first seat to the first outlet around the bore.

3. A relief valve as defined in claim 2 which includes a common spring biasing the poppet toward the seat and the pilot valve in the opposite direction toward the second seat.

4. A pilot operated hydraulically balanced pressure relief valve comprising a body having an inlet and an outlet, a poppet valve normally closing flow therebetween and having nearly equal opening and closing areas exposed to inlet pressure, a restricted orifice between the inlet and the closing area, manual means for venting the closing area to the outlet to open the poppet at will independently of inlet pressure, a pilot relief valve exposed to the closing area and having two stages of opening, in the first of which at a predetermined pressure the manual means, if not venting the closing area, is caused to move to a venting position and in the second stage, the poppet acts to limit the inlet pressure to a predetermined higher value.

5. A relief valve as defined in claim 4 wherein the manual means is a spring-centered, detented directional control valve having ports and lands controlling flow from the closing area to the outlet.

6. A relief valve as defined in claim 5 wherein the first stage opening of the pilot relief valve ports fluid to release the detent.

* * * * *